A. E. WITHAM.
LEVER LOCKING DEVICE.
APPLICATION FILED DEC. 15, 1909.
980,467.
Patented Jan. 3, 1911.
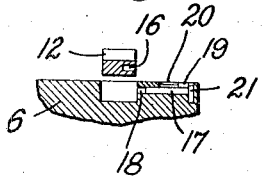
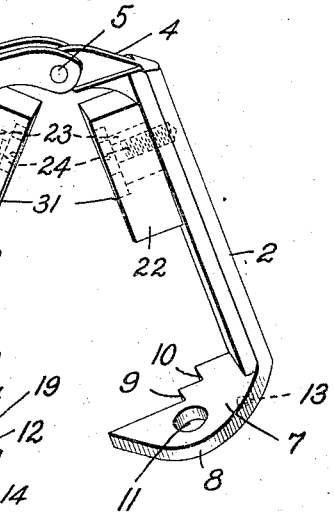
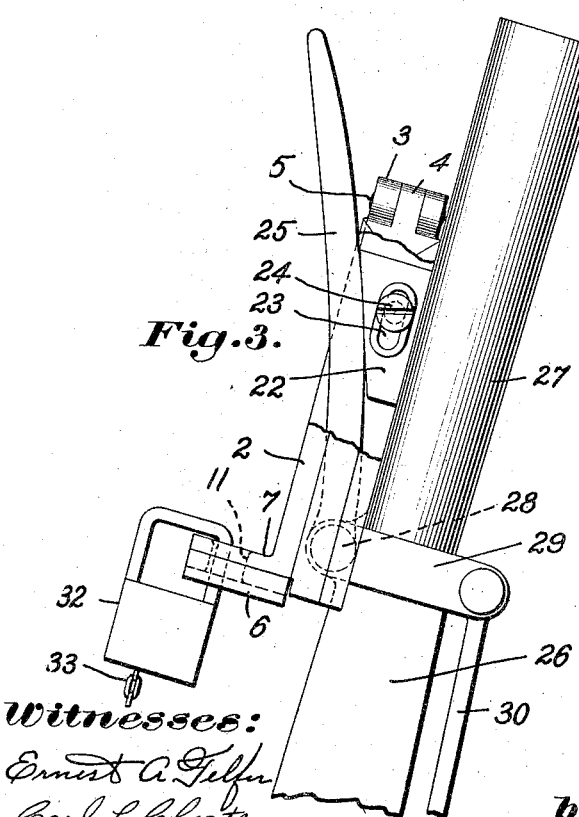
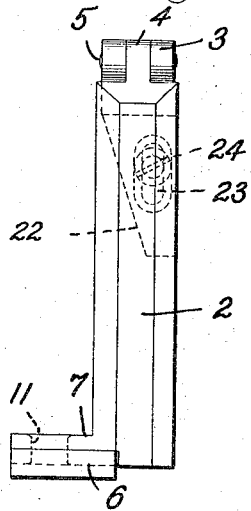
Inventor:
Adelbert E. Witham
by Emery & Booth
att'ys.
Witnesses:

UNITED STATES PATENT OFFICE.

ADELBERT E. WITHAM, OF BOSTON, MASSACHUSETTS, ASSIGNOR OF ONE-HALF TO A. PERCIVAL CHITTENDEN, OF BROOKLINE, MASSACHUSETTS.

LEVER-LOCKING DEVICE.

980,467. Specification of Letters Patent. Patented Jan. 3, 1911.

Application filed December 15, 1909. Serial No. 533,176.

*To all whom it may concern:*

Be it known that I, ADELBERT E. WITHAM, a citizen of the United States, and a resident of Boston, in the county of Suffolk, State of Massachusetts, have invented an Improvement in Lever-Locking Devices, of which the following description, in connection with the accompanying drawings, is a specification, like letters on the drawings representing like parts.

My invention relates to appliances for locking in desired position the brake or other lever of an engine and is particularly adapted for use in connection with automobiles although it is by no means restricted to such use.

In most of the States the law now requires that, when an automobile is left standing, unattended, in a public thoroughfare the brake must be set and the vehicle locked, in some manner, to prevent it from being set in motion by unauthorized parties or any accidental cause. While it is common to so disconnect the engine that it cannot be started by thoughtless or mischievous persons there is, so far as I am aware, no convenient attachable and detachable means for locking the emergency or ratchet brake lever, after setting the same, and my invention aims to provide a convenient means for preventing movement of such lever by locking the same in desired position.

In the drawing illustrating one embodiment of my invention selected for description and illustration herein, Figure 1 is a perspective view thereof, the jaws being shown open; Fig. 2 a side elevation thereof; Fig. 3 a vertical, partly sectional, view of the lock in position on a conventional form of automobile brake lever; and Fig. 4 a vertical, sectional view on the line 4—4 of Fig. 1, showing the latch in raised position.

Referring first to Fig. 1, my improved locking device, as shown, comprises two jaws 1 and 2 of desired length, and provided at one, herein the upper, of their ends with laterally extended arms 3 and 4, movably connected as by a hinge pin 5. At their opposite ends these jaws 1 and 2, see Fig. 1, are provided with inturned ears 6, 7, and shown as having notched rear edges, to be more particularly referred to, and rounded front edges 8, said ears being widest across the central portions thereof. One of the hinged jaws, herein 2, is shown as slightly shorter than the opposite jaw 1, so that when the jaws are closed the ear 7, on said jaw 2, will overlie the ear 6, on jaw 1 and conform in outline therewith.

The shoulders 9 on the rear edges of the ears 6 and 7 are adapted to abut wh 1 the jaws are closed, but they are respectively notched to leave between them a rectangular recess 10 to receive the edge of the brake lever and thereby assist in positioning the lock thereon. Obviously, the recess may be of any desired depth or width to receive levers of different forms and dimensions.

Each ear 6, 7, Fig. 1, is provided with an aperture 11, which registers with the other aperture when the jaws are closed, Fig. 3, and these apertures are adapted to receive any suitable locking means to retain the jaws in closed position. The ears 6 and 7, see Fig. 1, are also provided with an auxiliary locking device, to be used either in addition to the lock referred to or in place thereof. Said auxiliary locking device is shown herein, Fig. 1, as comprising a suitable spring actuated latch 12, suitably mounted in the upper face of one ear, herein the ear 6, and a coöperating recess 13 formed in the under face of the opposite ear 7 and adapted to receive the latch 12 when the ears are in closed position. The latch 12 may be manipulated by any convenient means, as a key 14 to be inserted at a key-hole 15. Any other convenient form of lock may be substituted for the one shown herein, if desired.

I have shown the latch 12, Fig. 4, provided with a slot 16, at one side thereof, adapted to receive a bolt or thumb latch 17 mounted in a passage 18, in the ear 6, said bolt having a vertical ear or thumb piece 19 thereon received by a narrowed and shorter portion 20 of the passage 18. This narrowed portion 20 of the passage 18, and the ear 19 may extend to the upper face of said ear, and the upper edges of the passage 18 being beveled to permit engagement of the ear 19 by the finger, there is thereby provided a convenient means for actuating said bolt 17 to secure said latch 12 in depressed or inoperative position when it is desired to dispense with the use thereof and rely upon the use of a locking device in connection with the apertures 11. This bolt may be retained in its passage 18 by any convenient means as by a pin 21 inserted in its path near the end of said passage.

On its inner face, see Fig. 1, each jaw is provided with a herein wedge shaped locking member 22, which may be adjustably secured thereto, in any convenient manner, as by a slot 23 in said member, Fig. 3, and a screw 24 received by said slot and threaded into the jaw, see also in dotted lines, Fig. 1. The screw 24 is preferably countersunk in the locking member 22 as shown in Fig. 1. These locking members are adapted to be closed about the hinge 5 and positioned back of the pawl actuating member or grip 25, and between it and the upper end of the lever 26 or handle 27 thereof, herein the brake lever, see Fig. 3. The pawl actuating member or grip is pivoted in usual manner at 28 to a boss on the edge of the lever 26 and is connected by the arm 29 with the pawl actuating rod or member 30, which acts to raise and depress the usual locking pawl—not shown—from and into the notches in the usual quadrant, also not shown, and thus to control the operation of the brake. Obviously these members 22 may be of any desired form or size, to fit approximately levers of different construction. They may be of such width that the inner faces 31 thereof, Fig. 1, will abut when in closed position, or not, as desired, it being only necessary that they be of sufficient width to prevent the pawl actuating member or grip 25 from being depressed between them.

The locking members 22 being adjustable vertically upon the jaws 1, 2, may be positioned to fit practically any space between the pawl actuating member or grip 25 and the handle 27, which is in some cases greater than in others. As the screws 24 are accessible only from the inner faces of the jaws 1, 2, there is no opportunity, after the jaws are closed, to remove or disturb the adjustment of the members 22.

The mode of using my lock is as follows: The jaws 1, 2, having been opened, as in Fig. 1, are positioned one at each side of and between the pawl actuating member or grip 25 and handle 27 and lowered until the locking members approximately fit between said pawl grip 25 and the handle 27, when they are closed, the ear 7 overlying the ear 6, as shown in Fig. 3.

As the ears 6, 7, are positioned one above the other they are automatically locked by the latch 12 engaging the recess 13, and may be additionally secured, if desired, by inserting a padlock or other locking device 32 through the apertures 11, Fig. 3. These ears 6, 7, being securely locked beneath the arm 29 the locking members cannot be removed except by the party possessing the proper key or keys. The brake being set and the actuating rod pawl being locked the car cannot be moved either by unauthorized parties or by accidental collision therewith by another car, nor can it start itself if left standing on an incline. This padlock 32 may, if preferred, for convenience, be secured to the lever 26 by a suitable chain 33.

Many modifications of the form of my invention disclosed herein may doubtless be constructed without departing from the spirit and scope of my invention.

Claims:

1. A lever locking device of the class described, comprising movably connected jaw-like members adapted to be positioned between the pawl actuating member and lever, and means to lock the same to one of said members to prevent removal of said jaw-like members therefrom.

2. A lever locking device of the class described, comprising relatively movable jaws, locking members thereon, and means to secure said jaws to the engine lever to prevent movement of said lever.

3. A lever locking device of the class described, comprising relatively movable jaws, adjustable locking members thereon, and means to secure said jaws in position to lock said lever locking device against releasing movement.

4. A locking device for a pawl actuating member, of the class described, comprising a plurality of jaws adapted to straddle the pawl actuating member and provided with locking means to prevent movement of said pawl actuating member.

5. A locking device for a pawl actuating member, of the class described, comprising a plurality of jaws adapted to straddle a pawl actuating member, ears on said jaws to interlock beneath said pawl actuating member and means on said jaws to prevent movement of said pawl actuating member.

6. A locking device for a pawl actuating locking member of the class described, comprising jointed jaws, laterally extended locking members thereon and means to secure said jaws with said locking members between the pawl actuating member and lever to prevent movement of either of them.

7. The combination, with a lever having means to lock it in any one of a plurality of positions, of a locking device for said lever having an adjustable section therein and locking means on said device operative to lock said device and lever in any of said lever positions.

8. A lever locking device of the class described, comprising a self-locking locking member provided with angularly adjustable members adapted to be positioned by angular adjustment of parts thereof between the lock actuating member and the lever to lock said lever in desired position.

In testimony whereof, I have signed my name to this specification in the presence of two subscribing witnesses.

ADELBERT E. WITHAM.

Witnesses:
A. PERCIVAL CHITTENDEN,
EVERETT S. EMERY.